United States Patent

David

[11] Patent Number: 6,105,944
[45] Date of Patent: Aug. 22, 2000

[54] MOUNT AND BONDED COMPONENT THEREFOR WITH SHAPE FACTOR REDUCING NOTCHES

[75] Inventor: Thomas A. David, Erie, Pa.

[73] Assignee: Lord Corporation, Cary, N.C.

[21] Appl. No.: 09/063,187

[22] Filed: Apr. 20, 1998

[51] Int. Cl.[7] .................................................. F16F 7/00
[52] U.S. Cl. ...................... 267/141.7; 267/292; 267/293; 267/140.11; 267/141; 267/141.3; 267/153
[58] Field of Search .................................... 267/293, 292, 267/140.12, 140.11, 141, 219, 141.2, 141.3, 141.7, 153; 180/312; 248/68.1

[56] References Cited

U.S. PATENT DOCUMENTS

| | | | |
|---|---|---|---|
| 3,330,515 | 7/1967 | Janssen et al. | 248/26 |
| 3,350,042 | 10/1967 | Stewart et al. | 248/22 |
| 3,455,525 | 7/1969 | Waermö | 248/15 |
| 3,531,070 | 9/1970 | Roddy | 248/15 |
| 3,586,306 | 6/1971 | Reece et al. | 267/153 |
| 4,184,658 | 1/1980 | Barahia | 248/606 |
| 4,951,930 | 8/1990 | Uno et al. | 267/293 |
| 5,000,429 | 3/1991 | Wittmar et al. | 267/153 |
| 5,024,425 | 6/1991 | Schwerdt | 267/293 |
| 5,031,885 | 7/1991 | Schwerdt | 267/141.2 |
| 5,158,271 | 10/1992 | Hein | 267/281 |
| 5,842,687 | 12/1998 | David . | |
| 5,927,678 | 7/1999 | Parr | 248/559 |

FOREIGN PATENT DOCUMENTS

| | | |
|---|---|---|
| 41 37 692 C1 | 7/1993 | Germany . |
| 2317 669 | 4/1998 | United Kingdom . |

*Primary Examiner*—Christopher P. Schwartz
*Assistant Examiner*—Devon Kramer
*Attorney, Agent, or Firm*—Randall S. Wayland; James W. Wright; Michael M. Gnibus

[57] ABSTRACT

A bonded component (126) adapted for insertion in a housing (120) thus forming a mount (118). The bonded component (126) includes an inner member (128) including a outer periphery (129) having a preferably non-planar profile along its width and an elastomer (130) bonded thereto. The elastomer (130) includes a first arcuate section (142) extending through a first arc ($\theta_1$) and having first and second lateral faces (150a–c), a second arcuate section (142') extending through a second arc ($\theta_2$) also having first and second lateral faces (150b–d), notches (148a–d) formed in first and second lateral faces of each of said first and second arcuate sections, the notches only extending part way across each of said sections. In another aspect, the location of the notches (148a–d) are vertically and/or angularly offset from said fore-and-aft axis (146). Bottom trough portions (149a–d) of the notches are preferably oriented such that they intersect preferably cylindrical peripheral faces (151a, 151b) of the arcuate sections 142, 142' at approximately a 45 degree angle.

15 Claims, 6 Drawing Sheets

LATERAL

MOUNT AND BONDED COMPONENT THEREFOR WITH SHAPE FACTOR REDUCING NOTCHES

BACKGROUND AND SUMMARY OF THE INVENTION

The present invention is directed to an elastomeric mount for use in supporting truck cabs, and the like. More particularly, the present invention is directed to a mount including cored-out sections to reduce vertical stiffness.

The prior art cab mount 18, for which the present invention improves upon is best shown in FIG. 1. The prior art mount 18 consists of a housing 20 adapted to be attached to a vehicle chassis by holes 22, 22' and a bonded component 26. The housing 20 has an axial through bore 22 with localized opposed fore-and-aft pockets 24, 24' formed therein. The bonded component 26 consists of an inner member 28 with elastomer 30 bonded thereto. A pair of such front mounts 18 are positioned on opposite sides of the cab at the front (fore) portion of the cab with their axial axes extending laterally of the chassis, thus forming a front pivot for the truck cab. Combinations of air springs and dampers are used at the back (aft) portion of the cab as is common practice. Notably, the pivotal motion at the front mounts 18 is minimal.

These mounts 18 are softest in the axial (lateral) direction, resisting lateral motion (into and out of the paper) of the cab by shearing the elastomer 30. Soft vertical stiffness is provided by upper and lower cored-out areas 32, 32' which extend laterally completely through the mount 18. Gross motions are delimited by upper and lower elastomer snubbers 34, 34'. The bonded component 26 is precompressed into the pockets 24, 24' which include radially inward projections 36a–36d at the pocket's radial ends which, together with pockets 24, 24', prevent rotation of the bonded component 26 within the housing 20. The mounts 18 provide good vertical isolation of the cab, while simultaneously carrying fore-and-aft and lateral loads and providing vertical snubbing.

Although adequate for some applications, such mounts 18 may have insufficient durability under more severe operating conditions. For example, under repeated large vertical down loads, the upper portions 38, 38' of the elastomer 30 will tend to separate and pull away from the pocket 24, 24' at these upper portions, thus losing their ability to contribute stiffness. As a result, the assembly becomes softer and any additional load results in proportionately larger deflection of the lower elastomer portions 40, 40'. This causes the lower portions to fail at a faster rate than desired.

The present invention produces the desired improved durability and service life by providing a bonded component and mount with localized notches which preferably only traverse part way across the periphery of the opposed arcuate sections in the lateral direction thereby changing the shape factor of the mount. This allows additional precompresssion to be carried on the upper elastomer portions as compared to the prior art. Allowing additional precompression, in effect, allows carrying of higher vertical loads before the upper elastomer portions pull away from the housing thereby improving overall durability and service life. In a preferred aspect, the bonded component includes an inner member having an external surface having a nonplanar profile along its axial width, such as a rounded profile, for example. According to another aspect, the location of the notches are vertically offset from a fore-and-aft axis passing through the arc center of first and second arcuate sections.

More preferably, the notches each include a bottom trough portion which intersects a peripheral surface of said arcuate sections at between a 30 and 50 degree angle. Upper and lower snubbers located above and below said inner member delimit vertical motions.

While this invention has been described as being useful as a cab mount for truck cabs, it could be used in other applications where an inexpensive, yet extended service life mount is desired. One particularly advantageous use would be as an engine mount. Various other aspects, features, advantages and characteristics of the present invention will become apparent after a reading of the following specification and claims.

BRIEF DESCRIPTION OF THE DRAWINGS

The present invention is described in terms of the preferred embodiment as shown in the Figures, in which.

DETAILED DESCRIPTION OF THE PREFERRED EMBODIMENT

Figure 1:
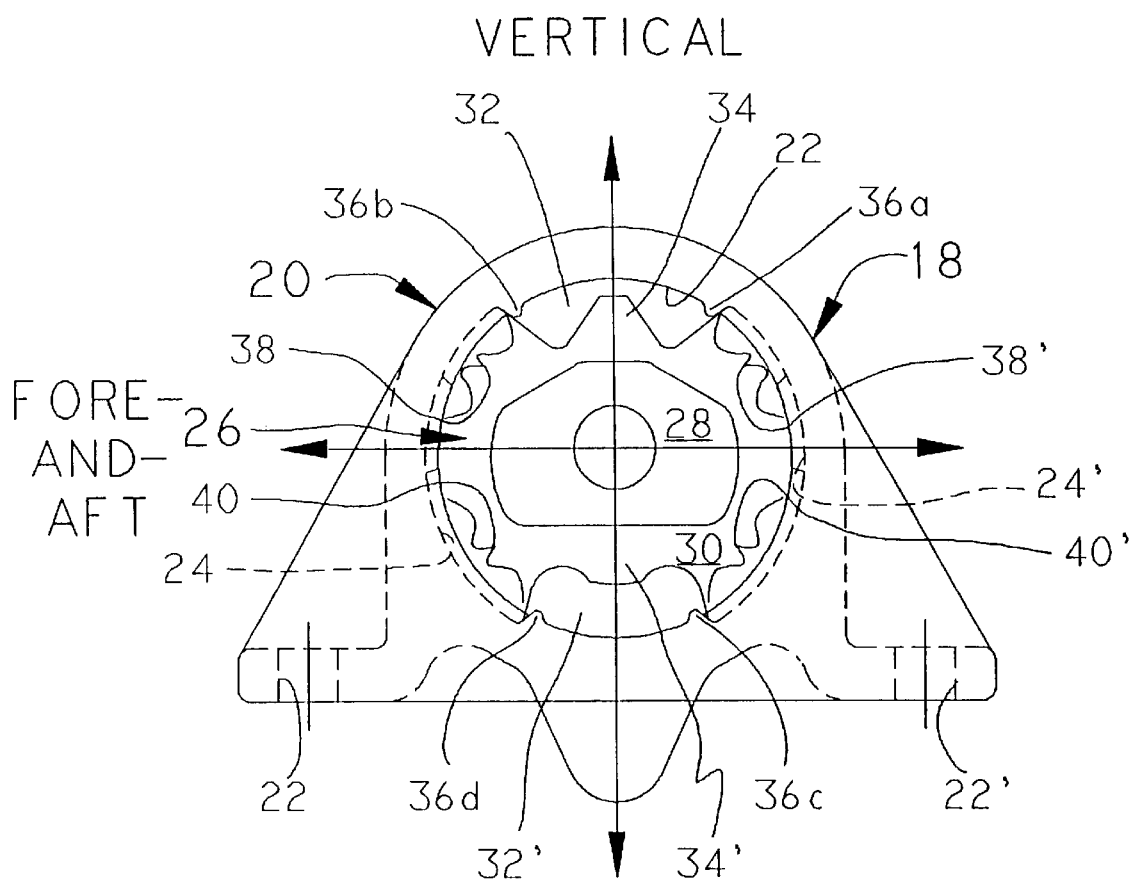
FIG. 1 is side view of a prior art mount.
Figure 2:
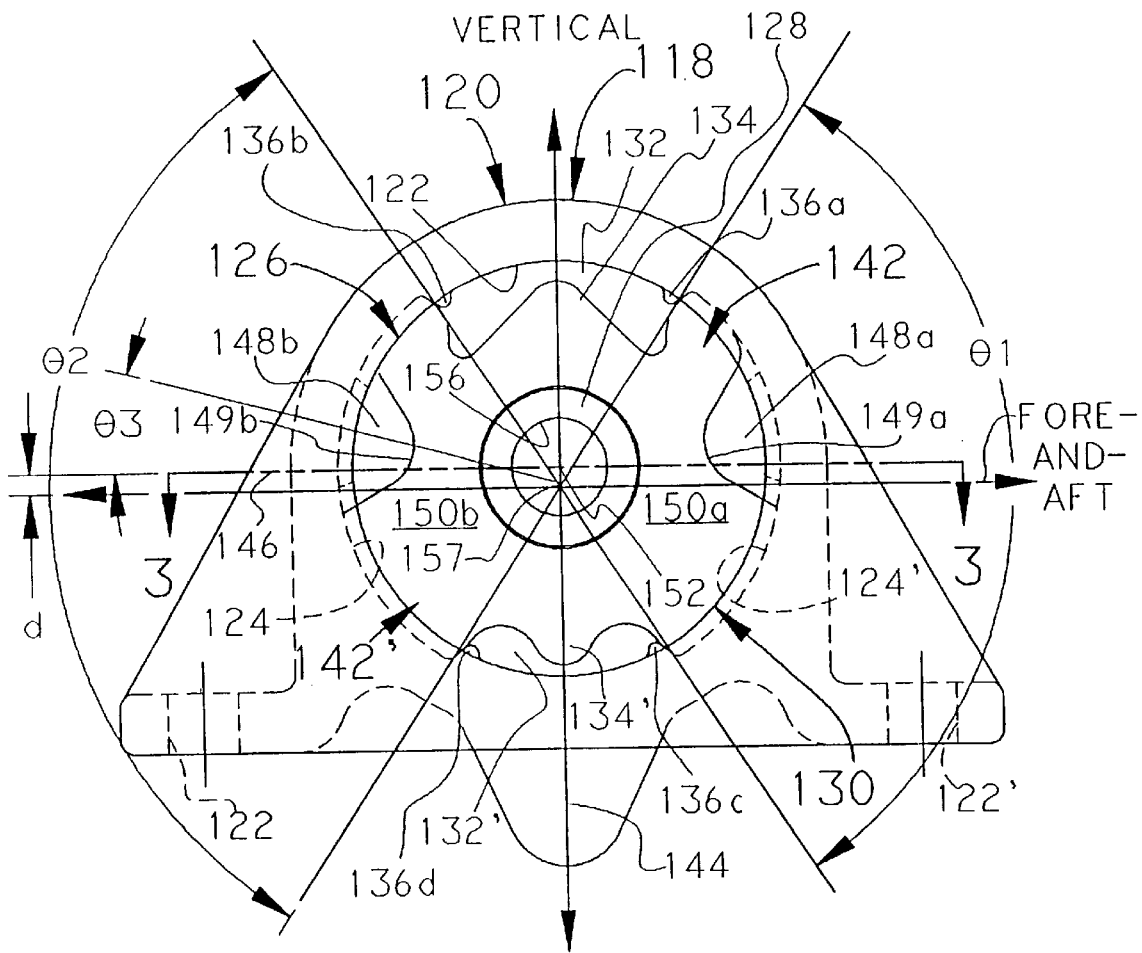
FIG. 2 is an side view of the mount in accordance with the invention.
Figure 3:
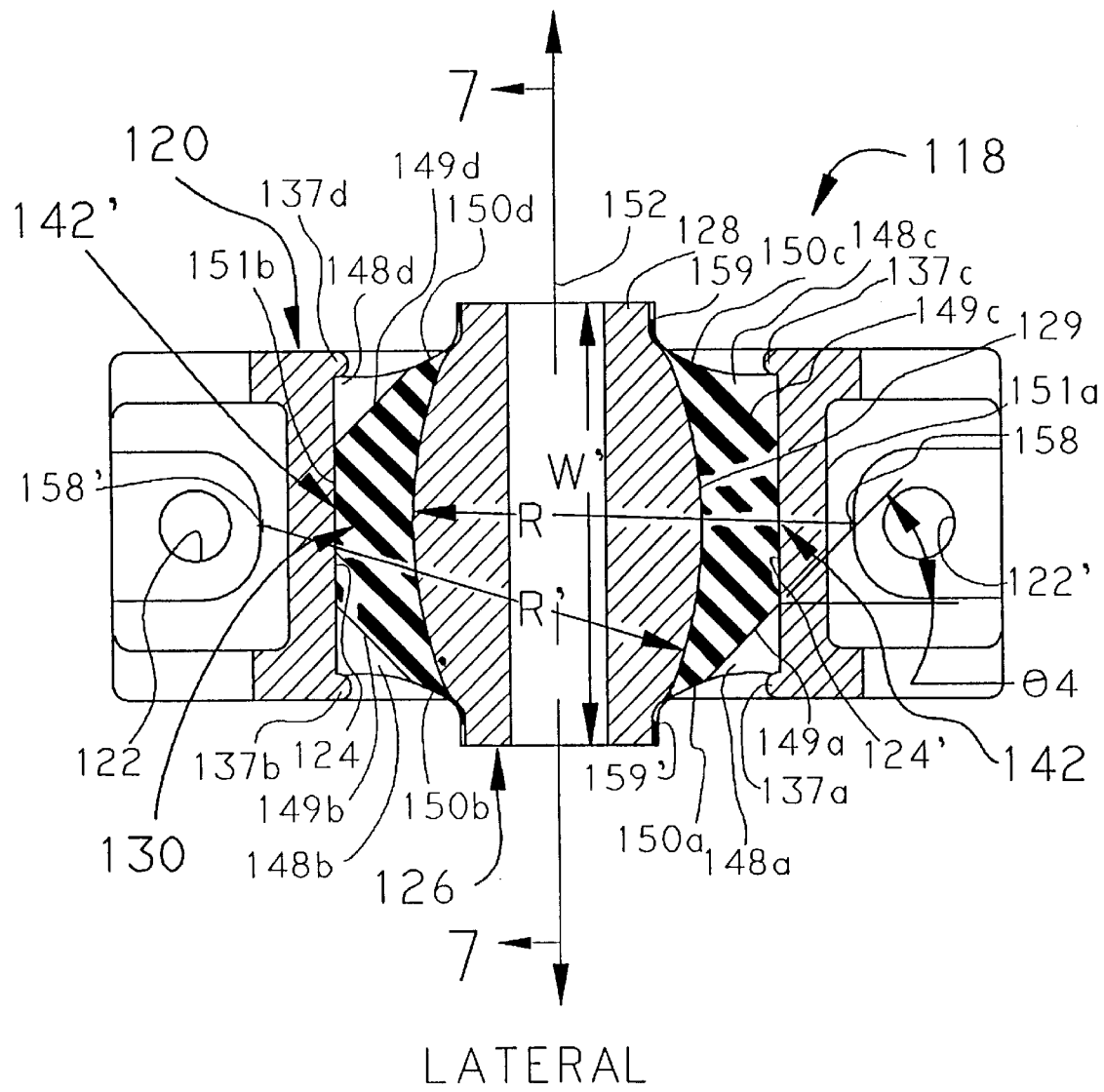
FIG. 3 is a top partially cross-sectioned view of the mount in accordance with the invention.

A mount in accordance with the present invention is shown in FIGS. 2 and 3 generally at 118. A preferably cast aluminum or steel housing 120, the same as heretofore described, includes a laterally extending cylindrical through bore 122 having fore-and-aft pockets 124, 124' recessed therein. Locator projections 136a–d located at the arcuate ends of pockets 124, 124' and axial lips 137a–d cooperate with the pockets 124, 124' to prevent rotation of the bonded component 126 relative to the housing 120 about the lateral axis 152. Holes 122, 122' are used to fasten the mount 118 to the frame structure, etc. Locator pilot 131 which extends from the bottom of housing 120 helps position the mount 118 relative to the corresponding holes in the structure. The bonded component 126, as best seen in FIGS. 2–5, includes an rigid steel inner member 128 having flexible, rubber or elastomer material 130 bonded to its outer peripheral surface 129. The elastomer 130 includes first and second arcuate sections 142, 142' which traverse radially through arc angles θ1 and θ2, respectively. By way of example and not to be considered limiting, the angles θ1 and θ2 are between about 90 degrees and 160 degrees, more preferably between 110 degrees and 120 degrees, and more preferably yet approximately 125 degrees. The first arcuate section 142 is positioned on a first side of the inner member 128 and on a first side of a vertical axis 144 passing through the center of inner member 128. Contrarily, the second arcuate section 142' is positioned on a second side of said vertical axis 144 and inner member 128 which is opposed to the first side. Each arcuate section 142, 142' is defined by radii having a common arc center 157.

Each of the sections 142, 142' includes first and second lateral faces 150a,150c and 150b, 150d, respectively. Lateral faces 150a–d preferably include tapered surfaces with a slight concave radius formed thereon. Each of the sections 142, 142' include radially peripheral surfaces 151a, 151b. The surfaces 151a, 151b are preferably cylindrical portions having an axis coincident with the lateral axis 157. The sections 142, 142' of bonded component 126 are inserted into, and received within, the housing 120 such that they are in a state of precompression, as best shown in FIG. 2. By way of example, the level of radial precompression is preferably between 15%–25% of an unstressed thickness of the elastomer 130, and more preferably about 20%. This, of course, is accomplished by making the pocket dimensions smaller than the overall radial dimension across the sections 142, 142' of the bonded component 126. A funnel fixture is used to install the component 126 into the pockets of housing 120 in its precompressed form. The elastomer 130 used to manufacture the bonded component is preferably a natural rubber. However, other suitable flexible materials may be used interchangeably, such as blends of natural and synthetic elastomer, silicone rubber, nitrile, neoprene, fluorocarbon elastomer, or thermoplastic elastomers (TPE's), etc.

In mount 118, (FIG. 2) upper and lower laterally extending cored-out sections 132, 132' are formed between the bonded component 126 and axial through bore 122 and extend between the arcuate sections 142, 142'. These cored-out sections 132, 132' are approximately positioned above and below the central axis 152 of the rigid inner member 128. The cored out sections 132, 132' reduce the vertical stiffness to acceptable levels to obtain good vertical isolation.

Figure 4:
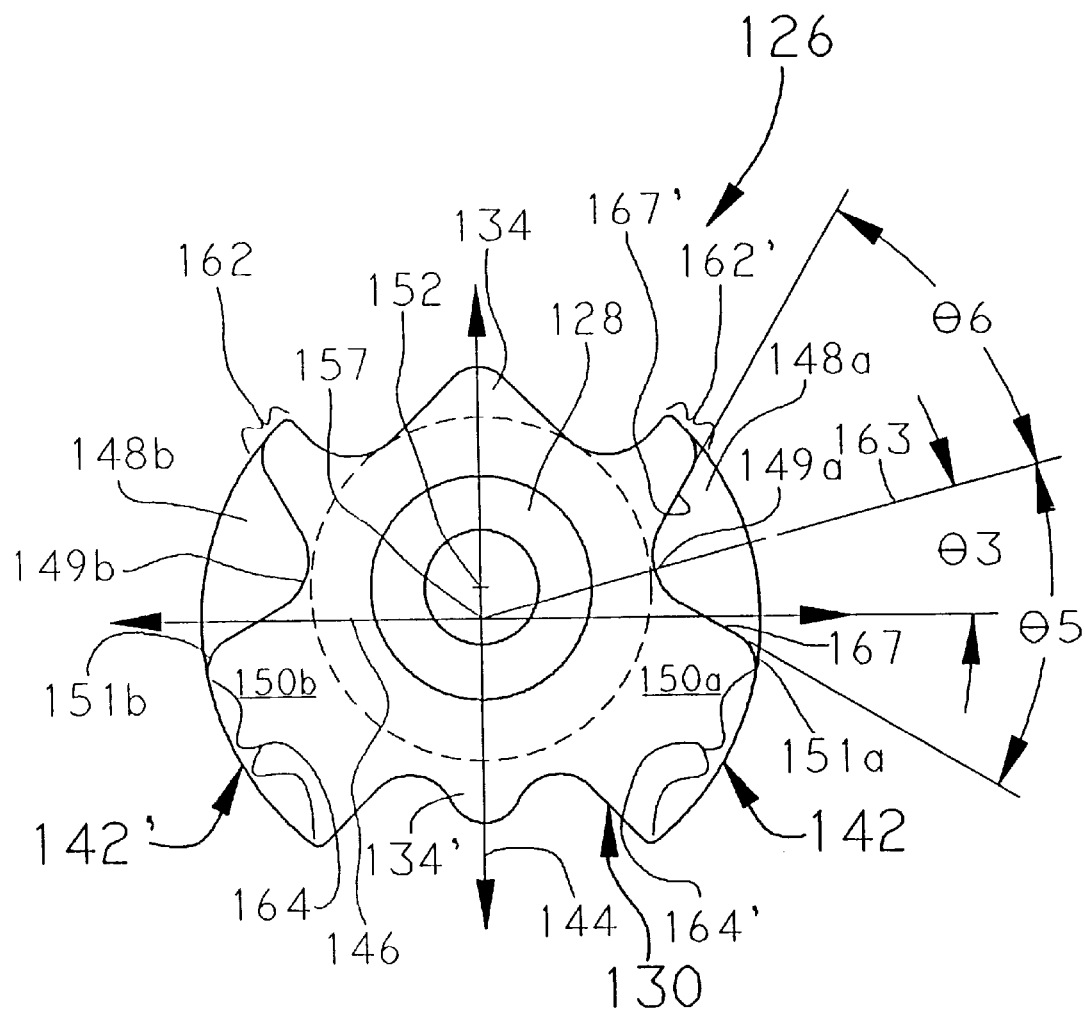
FIG. 4 is a side view of the bonded component in accordance with the invention.
Figure 5:
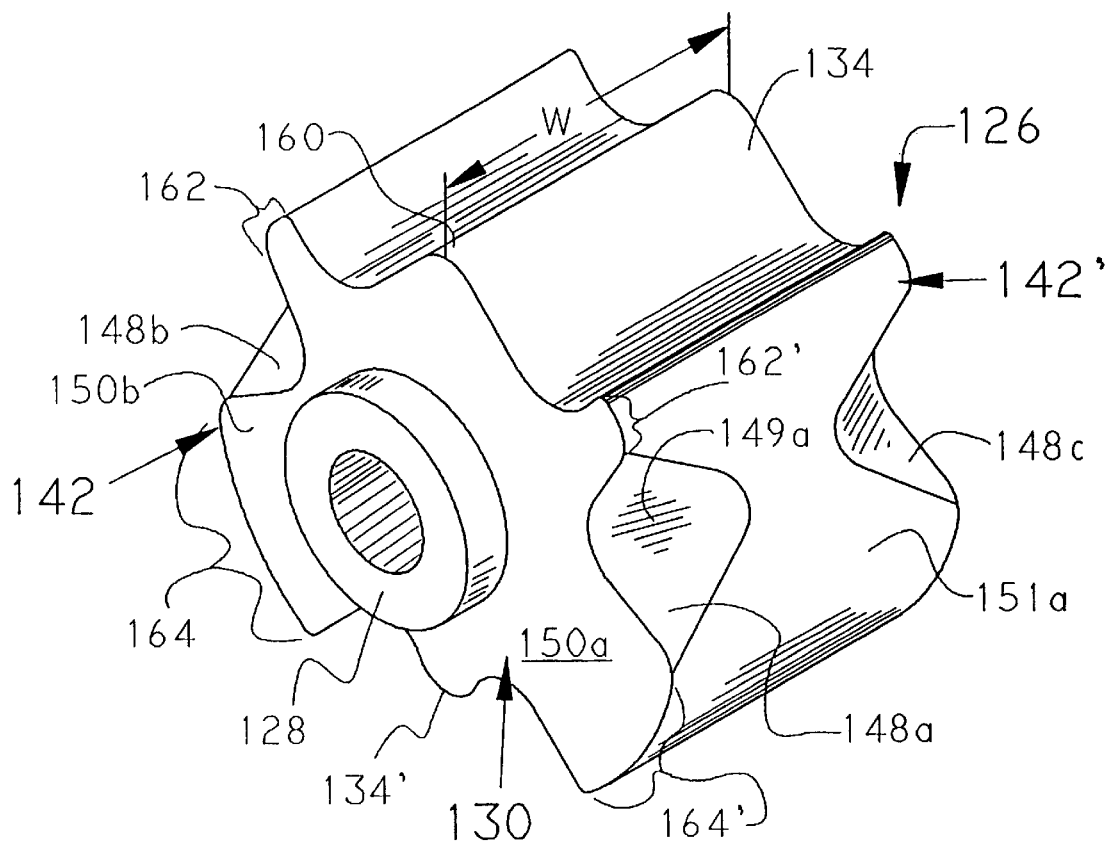
FIG. 5 is a perspective view of the bonded component in accordance with the invention.
Figure 6:
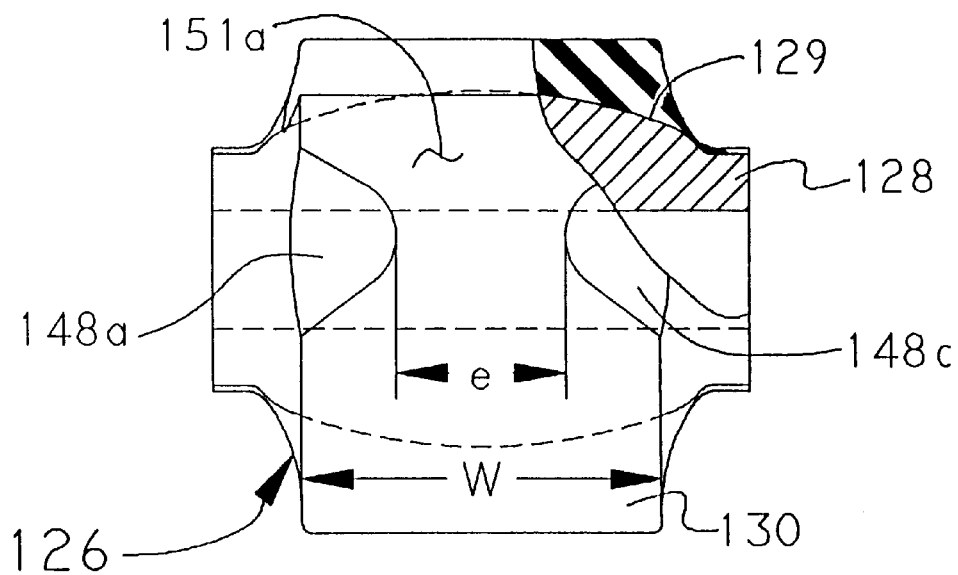
FIG. 6 is a partially cross-sectioned end view of the bonded component in accordance with the invention.

In one novel aspect, a first set of localized notches 148a, 148b are formed in the first lateral faces 150a, 150b of the first and second arcuate sections 142, 142'. Likewise, a second set of notches 148c, 148d are formed into the second lateral faces 150c, 150d of the first and second arcuate sections 142, 142'. Notably, the notches 148a–d are also formed in the generally cylindrical portions of the peripheral surfaces 151a, 151b. Most preferably, the notches 148a–d extend only part way across each of the sections 142, 142' as best illustrated in FIGS. 5 and 6. Moreover, the location of the notches 148a–d are preferably vertically offset from the fore-and-aft axis 146 (FIGS. 2 and 4). The fore-and-aft axis 146 is generally perpendicular to the vertical axis 144 and passes through the arc center 157. Preferably also, the notches 148a–d each include a bottom trough portion 149a–d which intersects a lateral line tangential to the radial peripheral surfaces 151a, 151b of the sections 142, 142' at an angle θ4 (FIG. 3) of between about 30 degrees and 50 degrees, and more preferably approximately 45 degrees.

Offsetting the notches 148a–d above the fore-and-aft axis 146 reduces the shape factor of the upper elastomer sections 162, 162' which are loosely defined as the elastomer portions above the notches 1481a–d thereby increasing the upper sections' 162, 162' ability to bulge as compared to the lower sections 164, 164'. This allows additional precompression to be imparted to these upper sections 162, 162' as compared to the lower sections 164, 164', thereby improving the vertical load carrying capability and, consequently, the durability and service life of the bonded component 126 and mounting 118. In a preferred aspect, the troughs 149a–d of notches 148a–d are angularly offset at an angle θ3 (FIG. 2) of between about 10 degrees to 20 degrees, and more preferably approximately about 15 degrees from the fore-and-aft axis 146. Each of the notches 148a–d preferably includes planar sides 167, 167' angled at angles θ5 and θ6 from the bisector line 163. Preferably, the angles θ5 and θ6 are between about 35 degrees and 55 degrees, and more preferably approximately 45 degrees.

As best seen in FIG. 3, the rigid inner member 128 preferably includes an external surface 129 having a non-planar profile along an axial width w' thereof. The profile may be arcuate or otherwise include a rounded portion substantially along its width w', for example. In a most preferred profile, the centers 158, 158' of respective radii R, R' defining the inner member's profile are offset from each other and offset from the lateral axis 152 thereby providing a football-shaped profile along a portion of its width. This profile was found by the inventor to be particularly effective at positioning the highest stresses within the central portion of the elastomer 130 and not near the lateral faces 150a–d where such high stresses may be detrimental. The inner member 128 also includes an axial bore 156 formed through it. Cylindrical extensions 159, 159' at either end of the inner member 128 provide portions which extend beyond the outermost lateral extent of the housing 120 such that an attachment clevis (not shown) can be readily secured thereto.

As best seen in FIGS. 2 and 4, the bonded component 126 and mount 118 preferably include snubbers 134, 134' for delimiting vertical motions. The upper and lower snubbers 134, 134' are located within the cored-out sections 132, 132' of mount 118 and extend vertically above and below the inner member 128. The snubbers are manufactured from the same elastomer as the rest of the component 126 and are also bonded to the inner member 128. At least one of the snubbers 134, 134' includes a pointed profile including a point 160 (FIG. 5) which extends along a lateral width w of the elastomer 130. In essence, snubbers prevent metal-to-metal contact between the housing and inner member upon encountering large vertical loads.

Referring now to FIG. 2, a center line 152 passing through the center of the inner member 128 and coincident with the axial center of the laterally extending bore 156 is preferably offset vertically from the fore-and-aft axis 146 by a predetermined distance d and is generally perpendicular thereto. The fore-and-aft axis 146 passes through the arc center 157 of the arcuate sections 142, 142' and also through the centers of the arcuate sections 142, 142'. Notably, the arc center defining the pockets 124, 124' is also substantially vertically aligned with the for-and-aft axis 146 and arc center 157.

Figure 7:
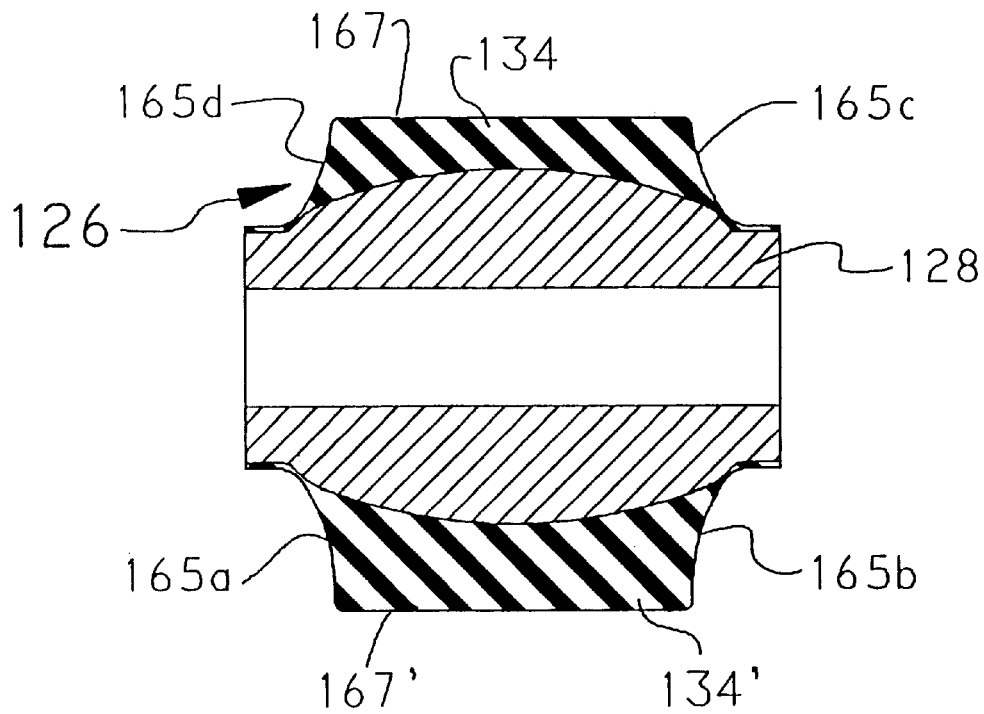
FIG. 7 is a cross-sectioned end view of the bonded component in accordance with the invention.

FIG. 6 and 7 illustrate various views of the bonded component 126. In FIG. 6, a partially cross-sectioned end view illustrates the location of the notches 148a and 148a as well as the profile on the periphery 129 of the inner member 128. It should also be clearly understood that the notches 148a–d preferably do not extend the full way across the peripheral surfaces 151a, 151b. In a preferred aspect, the notches 148a–d extend only between about 20% to 40%, and more preferably about 30%, of the total distance w across the peripheral surfaces 151a, 151b. This leaves an exposed portion e which is approximately 40% of the total width w of the elastomer 130. This allows for substantial fore-and-aft loads to be carried by the bonded component 126 and mounting 118.

FIG. 7 illustrates clearly the cross section of the snubbers 134, 134' and inner member 128. Each of the snubbers 134, 134' include a straight portions 167, 167' and tapered ends 165a–d having a slight radius formed thereon.

In summary, the present invention is a bonded component and mount with localized notches which preferably only traverse part way across the periphery of the opposed arcuate sections thereby changing the shape factor of the elastomer. This allows additional precompresssion to be carried on the upper elastomer portions as compared to the prior art. This allows carrying of higher vertical loads before the upper elastomer portions pull away from the housing thereby improving overall durability.

Various changes, alternatives and modifications will become apparent to a person of ordinary skill in the art after a reading of the foregoing specification. It is intended that all such changes, alternatives and modifications as fall within the scope of the appended claims be considered part of the present invention.

What is claimed is:

1. A bonded component, comprising:
   (a) an inner member including an outer radial periphery, and
   (b) an elastomer bonded to said outer radial periphery, said elastomer further comprising:
      a first arcuate section extending radially through a first arc being positioned on a first side of a vertical axis, said first arcuate section including first and second lateral faces and a peripheral surface,
      (ii) a second arcuate section extending radially through a second arc being positioned on a second side of said vertical axis opposed to said first side, said second arcuate section including first and second lateral faces and a peripheral surface, and
      (iii) notches formed in first and second lateral faces of each of said first and second arcuate sections, said notches only extending part ways across the peripheral surfaces of each of said sections.

2. The bonded component of claim 1 wherein said inner member includes an external surface having a non-planar profile along an axial width thereof.

3. The bonded component of claim 2 wherein said profile includes a rounded portion substantially along said width.

4. The bonded component of claim 1 wherein a location of said notches are vertically offset from a fore-and-aft axis which is substantially perpendicular to said vertical axis.

5. The bonded component of claim 1 further including upper and lower snubbers located above and below said inner member.

6. The bonded component of claim 1 wherein a center line of said inner member is offset vertically from a fore-and-aft axis which passes through an arc center defining a center of said arcuate sections.

7. The bonded component of claim 1 wherein said inner member includes a central laterally extending through bore symmetrical with said outer radial periphery.

8. A mount including the bonded component of claim 1 wherein said bonded component is received in a housing.

9. A mount of claim 8 wherein said housing includes a through bore extending laterally through said housing and first and second pockets recessed into said through bore, and including a through bore extending laterally through said housing and first and second pockets recessed into said through bore.

10. A bonded component, comprising:
    (a) an inner member including an outer radial periphery, and
    (b) an elastomer bonded to said outer radial periphery, said elastomer further comprising:
       (i) a first arcuate section extending radially through a first arc being positioned on a first side of a vertical axis, said first arcuate section including first and second lateral faces,
       (ii) a second arcuate section extending radially through a second arc being positioned on a second side of said vertical axis opposed to said first side, said second arcuate section including first and second lateral faces,
       (iii) notches formed in first and second lateral faces of each of said first and second arcuate sections, said notches only extending part ways across each of said sections; and
    wherein a location of said notches are angularly offset from a fore-and-aft axis which is substantially perpendicular to said vertical axis.

11. A bonded component, comprising:
    (a) an inner member including an outer radial periphery, and
    (b) an elastomer bonded to said outer radial periphery, said elastomer further comprising:
       (i) a first arcuate section extending radially through a first arc being positioned on a first side of a vertical axis, said first arcuate section including first and second lateral faces,
       (ii) a second arcuate section extending radially through a second arc being positioned on a second side of said vertical axis opposed to said first side, said second arcuate section including first and second lateral faces,
       (iii) notches formed in first and second lateral faces of each of said first and second arcuate sections, said notches only extending part ways across each of said sections; and
    wherein said notches include a bottom trough portion which intersects a peripheral surface of said arcuate sections at between a 30 and 50 degree angle.

12. A bonded component, comprising:
    (a) an inner member including an outer radial periphery, and
    (b) an elastomer bonded to said outer radial periphery, said elastomer further comprising:
       (i) a first arcuate section extending radially through a first arc being positioned on a first side of a vertical axis, said first arcuate section including first and second lateral faces,
       (ii) a second arcuate section extending radially through a second arc being positioned on a second side of said vertical axis opposed to said first side, said second arcuate section including first and second lateral faces,
       (iii) notches formed in first and second lateral faces of each of said first and second arcuate sections, said notches only extending part ways across each of said sections; and
    (c) upper and lower snubbers located above and below said inner member wherein one of said snubbers includes a pointed profile which extends along a lateral width of said elastomer.

13. A bonded component, comprising:
    (a) an inner member including an outer radial periphery having a convex profile formed along a width thereof and a central lateral through bore symmetrical with said periphery, and
    (b) an elastomer bonded to said inner member, said elastomer further comprising;
       (i) a first arcuate section extending radially through a first arc, said first arcuate section being positioned on a first side of a vertical axis aligned with said through bore, said first arcuate section including first and second lateral faces,
       (ii) a second arcuate section extending radially through a second arc, said second arcuate section being positioned on a second side of said vertical axis which is opposed to said first side, said second arcuate section including first and second lateral faces, (iii) notches formed in said first and second lateral faces each of said first and second arcuate sections, said notches only extending part way across each of said sections, said notches being vertically offset from a fore-and aft axis passing through an arc center of said sections.

14. A bonded component, comprising:

(a) an inner member including an outer radial periphery having a non-planar profile formed along an axial width, said inner member having a central lateral through bore symetrical with said periphery, and (b) an elastomer bonded to said inner member, said elastomer including;

(i) a first arcuate section extending radially through a first arc, said section being positioned on a first side of a vertical axis aligned with said through bore, said first arcuate section including first and second lateral faces and a generally cylindrical peripheral portion, (ii) a second arcuate section extending radially through a second arc, said second section being positioned on a second side of said vertical axis which is opposed to said first side, said second arcuate section including first and second lateral faces and a cylindrical peripheral portion, (iii) notches formed in first and second lateral faces of each of said first and second arcuate sections, said notches only extending part way across a width each of said sections, said notches being vertically offset from said vertical axis and having a through bottom which intersects said peripheral surfaces at between a 30 degree and 50 degree angle.

15. A mounting, comprising:

(a) a housing including a throughbore, and (b) a bonded component further comprising an inner member including an outer radial periphery and having a non-planar profile formed along a width thereof and including a central lateral through bore and an elastomer bonded to said inner member, said elastomer further comprising;

(i) a first arcuate section extending radially through a first arc ($\theta_1$), said section being positioned on a first side of a vertical axis aligned with said through bore, said first arcuate section including first and second lateral faces, (ii) a second arcuate section extending radially through a second arc, said second section being positioned on a second side of said vertical axis which is opposed to said first side, said second arcuate section including first and second lateral faces, said first and second arcuate sections cooperating with said housing to form core-out sections, and (iii) notches formed in first and second lateral faces of each of said first and second arcuate sections, said notches only extending part way across each of said sections, said notches being vertically offset from said vertical axis.

* * * * *